United States Patent

[11] 3,581,128

| [72] | Inventors | Alfred Meisner;<br>Walter Spitzl, Nurnberg, Germany |
|---|---|---|
| [21] | Appl. No. | 863,525 |
| [22] | Filed | Oct. 3, 1969 |
| [45] | Patented | May 25, 1971 |
| [73] | Assignee | Diehl<br>Nurnberg, Germany |
| [32] | Priority | Oct. 9, 1968 |
| [33] | | Germany |
| [31] | | P 18 01 972.2 |

[54] STEPPING WHEEL
12 Claims, 6 Drawing Figs.

[52] U.S. Cl. .................................................. 310/21,
58/116
[51] Int. Cl. .................................................. H02k 7/02

[50] Field of Search .......................................... 58/23 (D),
116 (M); 310/21, 22; 335/28

[56] References Cited
UNITED STATES PATENTS
| 2,571,085 | 10/1951 | Clifford ...................... | 58/116 |
| 2,743,614 | 5/1956 | Clifford ...................... | 58/116 |

*Primary Examiner*—Bernard A. Gilheany
*Assistant Examiner*—F. E. Bell
*Attorney*—Walter Becker

ABSTRACT: A drive for a clockworks in which a magnet is caused to oscillate adjacent a wheel in the radial direction of the wheel. An undulating magnetic path is formed on the wheel in the range of oscillation of the magnet and the configuration of the magnetic path is such that oscillation of the magnet will develop a torque on the wheel to drive it in one direction only.

PATENTED MAY 25 1971 3,581,128

INVENTOR.
ALFRED MEISNER AND
WALTER SPITZL.
BY

INVENTOR.
ALFRED MEISNER AND
WALTER SPITZL.

STEPPING WHEEL

The present invention relates to a stepping or advancing wheel with a magnetic or ferromagnetic shaft path for clock drives in which a time normal, such as a tuning fork, a leaf-spring rocker, or the like, is provided, while the time normal has at least one of its oscillating ends provided with a magnet which in its turn cooperates with a magnetic shaft path of the stepping wheel in such a way that the said stepping wheel is by means of said oscillating time normal magnetically moved through the intervention of its shaft path and is subjected to rotation.

Such stepping or advancing and also stopping wheels are known. In this connection reference may be had to German Pat. No. 812,615 and Swiss Pat. No. 445,991. Such stepping wheels are driven by a time normal, as for instance a tuning fork, a leaf spring or similar transversely oscillating time normals which have their free oscillating ends provided with a magnet. This is effected in such a way that the oscillating magnet cooperates with a magnetic or ferromagnetic path, a so-called shaft path, and thereby rotates the stepping or advancing wheel. The axis of the advancing wheel is operatively connected to a normal clock drive and thereby brings about a drive of the pointers or hands.

These heretofore-known advancing wheels have the drawback that the torque to be transferred is rather small and that thus the necessary force for driving the hands will not always be available. This is due to the fact that the shaft path is not designed for an optimum so that the advancing wheel carries out a nonuniform movement and stands still at the reversing points of the shaft path. As a result thereof, the magnet of the oscillating time normal will at a higher load acting on the advancing wheel and the slowdown of the latter inherent thereto loose its synchronism whereby the time normal as well as the advancing wheel come to a standstill. Furthermore, with this known advancing wheel there also exists the possibility that it will not start by itself.

It is, therefore, an object of the present invention to provide a stepping or advancing wheel which will overcome the above mentioned drawbacks and will be able to produce a high torque.

It is another object of this invention to provide a stepping wheel as set forth in the preceding paragraph, which will assure a self-starting of the stepping wheel without requiring additional mechanical means while said wheel will start in a predetermined direction.

These and other objects and advantages of the invention will appear more clearly from the following specification in connection with the accompanying drawings, in which.

Figure 2:
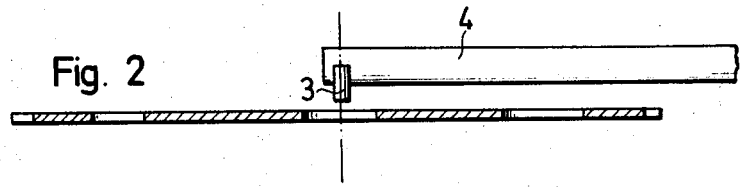
FIG. 2 is a section taken along the line II–II of FIG. 1.

The above outlined objects have been realized by an advancing wheel according to the invention which is characterized primarily in that for purposes of transferring a torque and for self-starting of the advancing wheel, the shaft path has a sine curve path in such a way that over its full magnetic width it intersects twice that imaginary pitch circle which is described by the stationary time normal with its magnet on the shaft path while the advancing wheel is rotating, within one pitch of the advancing wheel, in other words, within a full sine oscillation of the shaft path. The wheel according to the invention is furthermore characterized in that in the shaft path there may be inscribed a sine curve the width of which corresponds approximately to the magnetically effective width of the magnet while the width of said magnet equals or is less than the narrowest area of the shaft path. The shaft path ends at its extreme values in a manner known per se in approximately radial sprockets while the shaft path is asymmetrically designed in such a way that those portions of the confinements of the shaft path, namely the inner confinements facing the pitch circle in which the ascending flanks of the shaft path merge with the downwardly extending flanks of the shaft path (extreme values of the inner confinement), are offset relative to the sine curve extending from the magnet of the time normal to the shaft path so that the magnet passes by the respective extreme value of the inner confinement prior to reaching the extreme value of its own curve path.

The present invention is based on the finding that the advancing wheel must run true as uniformly as possible if a high torque is to be transferred or conveyed and that furthermore good advancing conditions must prevail in order to assure a safe movement of the advancing wheel also at the reversing points of the shaft path (Wellenpfad). Based on this finding, a sinelike shape is suggested for the shaft path and, more specifically, in such a way that the imaginary pitch circle described by the resting time normal with its magnet while the advancing wheel rotates on the shaft path is intersected by the shaft path over its full magnetic width twice per each complete Therefore, and that into the shaft path a sine curve can be inscribed the width of which approximately corresponds to the effective width of the magnet. This is not the case with heretofore known solutions as advanced in the above-referred-to patents. According to the first mentioned solution, the shaft path is so designed that it intersects the said imaginary pitch circle over its full width, but the shaft path is not sine-shaped nor does it have a design which permits the inscription of a sine curve of the above-mentioned type. According to the second above-mentioned solution, the shaft path is so designed that a circular ring-shaped portion of the shaft path extends at a constant distance from the axis of the advancing wheel and, more specifically, on the above-mentioned pitch circle while the shaft path starting from the central portion extends as sprockets radially inwardly and outwardly. Therefore, the pitch circle is not traversed by the shaft path over its full magnetic width but instead extends to a considerable part along said pitch circle. With these known stopping or advancing wheels the oscillating magnet describes on the shaft path no sine curves but hyperbolalike curves which results ultimately in the nonuniform movement of the advancing wheel.

With this known advancing wheel, at the reversing points of the movement of the magnet there prevails always a definite component of movement for the advancing wheel either in one or the other direction, and this is due to the hyperbolalike curve of the magnet. Such component of movement, however, does not exist with a pure sine-shaped course of the shaft path because with a sine curve dead center points exist at the extreme values of the shaft path which dead center points may, if they are not passed through at a sufficient speed, bring about a standstill of the advancing wheel.

A component of movement and simultaneously a satisfactory condition for the advancement are realized by the present invention due to the fact that the shaft path, similar to heretofore known solutions, at its extreme values extends into approximately radial sprockets and that it furthermore has an asymmetrical design to the extent that those portions of the confinements which face the pitch circle, i.e. the inner confinements of the shaft path in which confinements the ascending flanks merge with the descending flanks of the shaft path (extreme values of the inner confinement) are offset relative to the sine curve described by the magnets of the time normal on the shaft path in such a way that the magnet passes by the extreme value of the inner confinement prior to reaching the extreme value of its own curve path. Thus, a displacement between the inner confinement of the shaft path and the path through which the magnet passes is obtained. This brings about that the magnet, when reaching its extreme value and when subsequently oscillating back, can move only into the desired portion of the shaft path, namely the descending flank. Consequently, when viewed from the extreme value of the sine curve of the magnet, this design of the shaft path aids the passage of the magnet of the time normal in one direction of the course of the shaft path whereas it opposes the passage of the magnet in the other direction.

A further improvement has been realized according to the invention by the fact that the transgression zone from the ascending to the descending flank has the shape of a sharp edge.

The approximately radial sprockets of the shaft path are primarily but not exclusively intended to form a safety means against an uncontrolled movement of the magnet out of the shaft path at the extreme values of the latter. By correspondingly designing and arranging these sprockets, it is possible in addition to further improving the advancing movement, simultaneously also to improve the conditions with regard to the self-starting operation.

According to a preferred embodiment of the invention, the approximately radial sprockets are asymmetrically designed with regard to the ascending and descending flank and the extreme value of the shaft path in such a way that they represent an approximately rearward extension of that portion of the shaft path (descending flank) which during the rotation of the advancing wheel adjacent the sprocket is passed through by the magnet. According to a further development of this design, the corresponding edge of each sprocket forms a sharp edge with that portion of the shaft path which represents the ascending flank, and that furthermore the said edge of each sprocket is so inclined with regard to the descending flank that its extension intersects the pitch circle within the area of the descending flank within or near the edge of the shaft path.

Thus, the sprockets of the shaft path which extend in the direction of the center of the advancing wheel are expediently, i.e. particularly in view of a simpler manufacturing process, simultaneously designed as the spokes of the advancing wheel.

For purposes of self-starting the advancing wheel, it is necessary that in addition to good advancing conditions the shaft path is within the area of the pitch circle magnetically wider than the remaining areas. With such a design it is easier for the advancing wheel to start vibrating with the oscillating time normal in its rest position and then, after the amplitude of the vibration has increased sufficiently, to start moving in one direction. The shaft path, therefore, must with regard to a good starting behavior of the advancing wheel have steep confining edges within the area of the pitch circle in order that the starting acceleration which acts upon the advancing wheel is held low. If, however, the advancing wheel is in full movement and the time normal is in run-in condition, the curve which is passed through by the magnet on the shaft path must be less steep than in the starting phase in order that the course of the wheel at this area will not be braked and will not be nonuniform. These two conditions which are actually contradictory to each other are brought into agreement with each other by broadening the shaft path in the area of the pitch circle while simultaneously such shape is resorted to that steep confining edges are formed. In view of the above-mentioned asymmetrical design of the shaft path, the advancing wheel is simultaneously given a preferred direction of its starting movement. In this connection, however, it is to be borne in mind that this self-starting in the preferred direction will be all the safer the lower the frequency of the time normal.

For purpose of dimensioning the degree of the magnetic coupling of the time normal with the advancing wheel, it is necessary that the magnetic width of the shaft path and the effective size of the magnet or magnets of the time normal are adjusted to each other for a good coupling and that furthermore the magnetic traction force is selected all the greater the higher the oscillating frequency is of the time normal and the higher the speed of the advancing wheel. In this connection, it will be appreciated that for each magnitude of the advancing wheel, i.e. different pitch as well as for each frequency of the time normal, the magnetic coupling should not exceed a certain empirical value because otherwise the oscillations of the time normal may be effected by irregularities in the course or running of the advancing wheel. Moreover, there exists the danger that with too high a load on the advancing wheel and the braking inherent thereto, also the time normal will be braked to a standstill.

With regard to the magnetic traction force it should be noted that the latter must be selected all the greater the higher the frequency is of the time normal and the higher the speed of the advancing wheel in order to assure a corresponding pull on the advancing wheel with a simultaneous transfer of a high torque.

In view of the two above mentioned conditions with regard to the coupling degree and the traction force, it will be necessary that the magnetic field of the magnet of the time normal is bundled as far as possible and that the effective width of the magnet equals and possible is slightly less than the magnetic width of the shaft path. This is important because the amplitude of the oscillating time normal and thus also the amplitude of the magnet may, in view of outer influences and also in view of possible reactions of the advancing wheel, vary somewhat, and it is necessary that also in such an instance a good coupling and interaction between the magnet and the shaft path is realized.

The shaft path or, as the case may be, also the entire advancing wheel is, in conformity with a further development of the invention, made of a soft magnetic material with a high starting permeability and low hysteresis losses. Such material may consist, for instance, of a nickel-iron-copper-molybdenum alloy and is obtainable on the market, for instance, under the trade names Mu-Metall and Permalloy.

As to the shape of the magnet or magnets, tests have proved that a circular shape of the magnet or magnets is highly advantageous.

Figure 1:
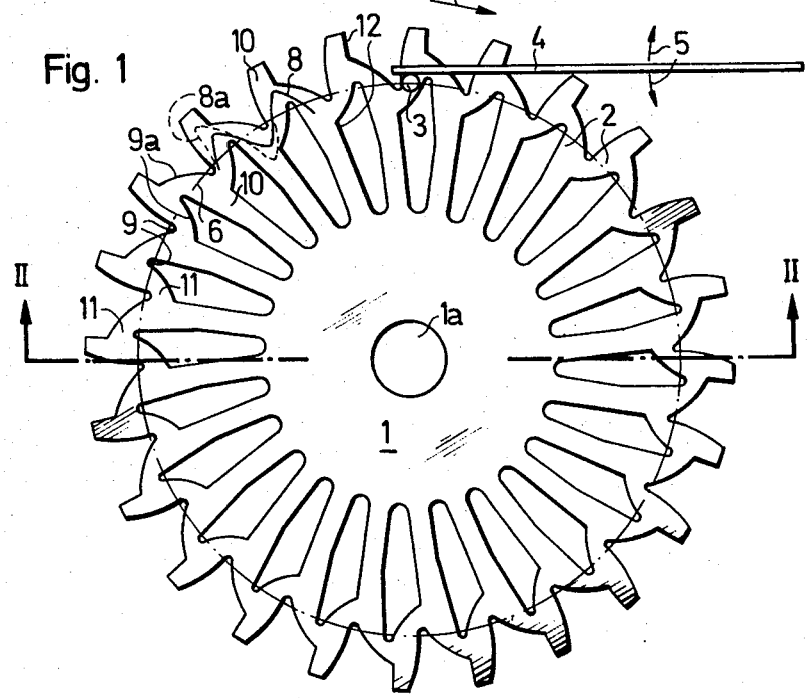
FIG. 1 illustrates a magnetic advancing wheel according to a first embodiment of the present invention on a scale enlarged approximately 10 times the natural size, FIG. 1 also showing the free oscillating end of the driving time normal.
Figure 3:
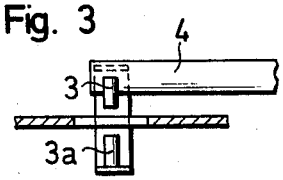
FIG. 3 illustrates similar to FIG. 2 an arrangement according to which the end of the time normal is provided with two magnets between which the magnetic advancing wheel moves.

Referring now to the drawings in detail, FIG. 1 shows a magnetic advancing wheel 1 which has a shaft path 2. This shaft path or, if desired, also the entire advancing wheel is made of a magnetic or ferromagnetic material with a high starting permeability and with low hysteresis losses. A magnet 3 of circular cross section cooperates with the shaft path. This magnet 3 is connected to the freely oscillating end of a time normal 4. The time normal 4 may be formed, for instance, by a tuning fork or by a so-called leaf-spring oscillator. Fundamentally, however, the employment of any transversal oscillating member is possible which oscillates in the direction indicated by the double arrow 5. In the particular example shown, a leaf-spring oscillator is employed. In connection with the present invention it is irrelevant whether this leaf-spring oscillator has one arm or two arms. Furthermore, it is immaterial whether the leaf-spring oscillator cooperates with the advancing wheel through the intervention of a single magnet as shown in FIGS. 1 and 2 or through the intervention of two magnets 3 and 3a in conformity with FIG. 3. An arrangement according to FIG. 3 is, however, preferred inasmuch as it is particularly suitable to produce a good traction force for the advancing wheel.

The imaginary pitch circle described by the magnet 3 with the stationary time normal 4 and with the rotating advancing wheel on the shaft path is designated with the reference numeral 6. With the oscillating time normal 4, the magnet 3 is adapted in view of its traction force to move the advancing wheel 1 in the direction of the arrow 7. If the shaft 1a of the advancing wheel 1 is under no load, the magnet 3 will on the shaft path 2 describe a sine oscillation 8. In this connection it is to be borne in mind that this sine curve has a width which corresponds approximately to the diameter of the magnet 3 while the latter is less or equals the narrowest area of the shaft path. The centerline of the said sine curve is designated with the reference numeral 8.

Figure 4:
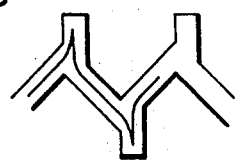
FIG. 4 is a theoretical curve according to which a highly satisfactory advancing condition is obtained.

As has been indicated in the introduction of this specification, it is important for the present invention that the shaft path has an approximate sine shape and it is furthermore important that the said sine curve is somewhat modified in order to assure a good advancing condition at the extreme values of the shaft path and to create the conditions for a self-starting. The shaft path according to the invention is thus determined by the elements of a pure sine curve and the elements of a curve according to FIG. 4 according to which a particularly good advancing condition is obtained. In this connection it is, therefore, furthermore important that the edges 9 (extreme value of the inner confinement) are not precisely located radially below or above the extreme value of the sine curve 8 but are located ahead of the extreme value when viewing in the direction of movement of the magnet. If the advancing wheel for some reason should stop temporarily while the magnet 3 is located at the extreme value of its oscillating movement (sine curve 8), the magnet subsequently returning to its rest position would swing inwardly in radial direction and hit the edge 9a of the advancing wheel at a standstill whereby automatically an advancing movement of the advancing wheel would be effected.

Also the consideration concerning the sprockets 10 aim in the same direction. When the magnet 3 in view of occurring increase in the amplitude (curve 8a) of the time normal 4 oscillates beyond the extreme value of the sine curve 8, the magnet 3 will move into the sprocket 10 and if the advancing wheel is at a standstill, when swinging back, would likewise hit upon the edge 9a. The magnet, however, could on the shaft path no longer return beyond the edge 9 and bring about a rotary return movement of the advancing wheel. In view of additional respective safety, it is therefore important that the edge 12 of the sprocket 10 has such an inclination that its extension intersects the shaft path at the edge 9a but not at the edge 9. For the same reason, namely for preventing a return movement of the magnet 3 in the undesired direction, there are also provided magnetic narrows 11. These narrows represent an increased magnetic resistance of the shaft path and therefore additionally prevent the magnet 3 from returning from its extreme value of its curve in the undesired direction.

For the self-starting it is important that the shaft path within the area of the pitch circle 6 is for the above mentioned reasons broadened. These confining edges of the shaft path are intended to intersect the pitch circle at as steep an angle as possible. The above mentioned geometric designs of the shaft path which produce a good advancing condition are also favorable for a self-starting of the advancing wheel in a predetermined direction, namely the desired direction of rotation.

The self-starting is effected in such a way that when the advancing wheel is at a standstill, the time normal 4 starts to oscillate. The magnet 3 moves from the illustrated rest position with increasing amplitude in radial direction with regard to the pitch circle 6. As soon as the magnet 3 starts to move out of the shaft path, the magnetic attraction force between the shaft path and the magnet brings about a slight movement of the advancing wheel. When the magnet 3 oscillates further a plurality of times back and forth with increasing amplitude, the advancing wheel begins to vibrate, and when the magnet has substantially reached its amplitude of operation, the advancing wheel starts to move in one of the two directions of rotation. If this movement is in the wrong direction of rotation, the magnet when entering a sprocket 10 will be guided by the edge 12 in such a way that when the magnet swings back, it will hit the edge 9a and will now definitely cause the advancing wheel to rotate in the predetermined or desired direction of rotation.

The curve 8 described by the magnet 3 on the shaft path applies in the illustrated position only to a situation in which the advancing wheel moves without load. With increasing load, the sine curve 8 is displaced in the direction of a drag of the advancing wheel relative to the oscillating movement of the magnet. When the load finally becomes too great, the work produced by the magnetic forces at the confinement edges of the shaft path will no longer be sufficient to advance the advancing wheel. The magnet leaves the shaft path, and the advancing wheel will stop in a short period of time.

As has been mentioned above, the coupling between magnet and shaft path should be as good as possible. This degree of coupling depends, however, on the quality of the time normal inasmuch as with higher quality of the time normal, also the degree of coupling can be higher. The reason for this consists in that possible disorders in the movement of the advancing wheel will react upon the time normal all the less the higher its quality. Thus, the torque to be transferred depends not only on a proper design of the shaft path but also on the quality of the time normal.

Figure 5:
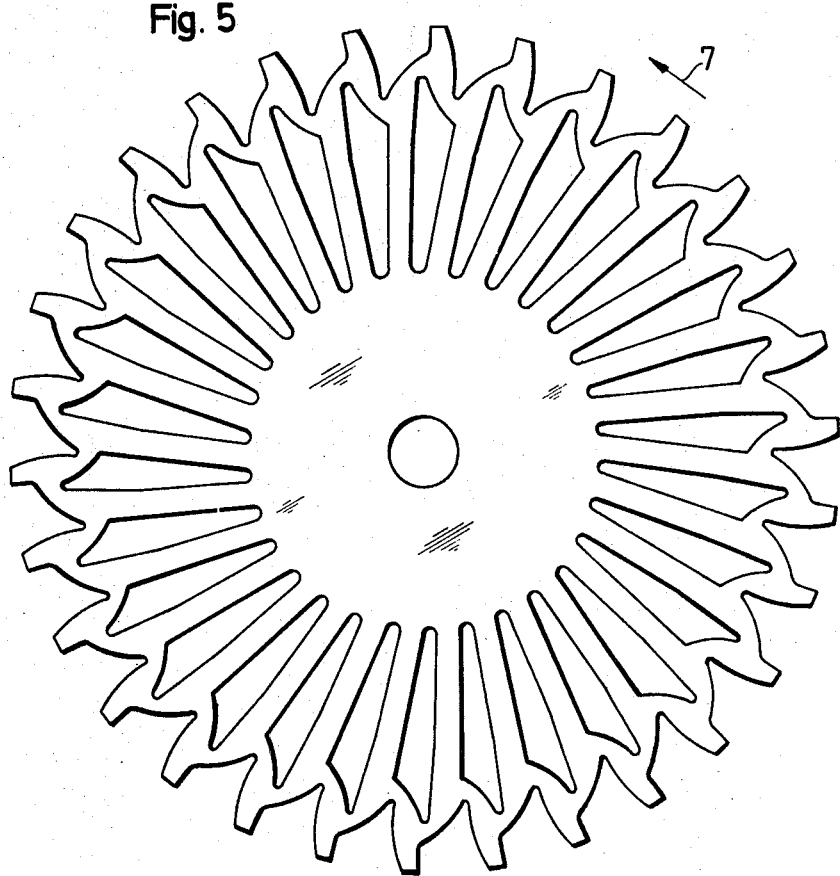
FIG. 5 represents a magnetic advancing wheel with opposite direction of movement and with the same shaft path as in FIG. 1 but with a larger pitch, namely with 30 instead of 25 outer sprockets.

The advancing wheel according to FIG. 5 has the same design of the shaft path as the arrangement according to FIG. 1, however, the pitch, namely the number of the outer sprockets or teeth 10, is increased from 25 to 30. The direction of rotation of this advancing wheel is opposite to that of the design of the embodiment shown in FIG. 1.

Figure 6:
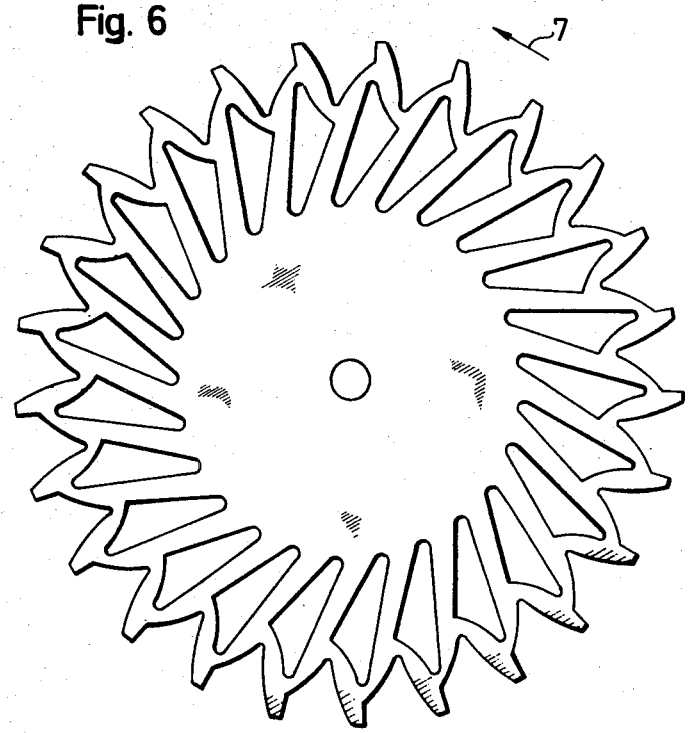
FIG. 6 represents an improved design of the advancing wheel according to the invention.

The embodiment according to FIG. 6 represents an improvement over the embodiments of FIGS. 1 and 5 inasmuch as the descending flanks of the shaft path from the extreme value to the pitch circle are flatter. This makes for a more uniform movement of the advancing wheel. The conditions for the starting of the advancing wheel are in view of the illustrated shape of the confining edges of the shaft path in the area of the pitch circle practically as good as with the first mentioned designs. The spokes of the advancing wheel represent extensions of the inner sprockets while the latter are somewhat more inclined over the embodiments of FIGS. 1 and 5. In view of this design of the sprockets, an improvement in the finished product will be obtained inasmuch the edges 9 are easier to machine. The direction of rotation of this advancing wheel is the same as that described in connection with FIG. 5.

It is, of course, to be understood that the present invention is, by no means, limited to the particular showing in the drawings but also comprises any modifications within the scope of the appended claims.

What we claim is:

1. A drive arrangement for a clockworks comprising: a rotatable wheel, means forming a circumferential magnetic path on said wheel which undulates in the radial direction with respect to a pitch circle concentric with the axis of rotation of the wheel, said magnetic path having substantially uniformly circumferentially spaced radially inner and radially outer peak regions and inclined regions interconnecting each said peak region with the peak regions adjacent thereto, an oscillating element, magnet means on said oscillating element adjacent said wheel having a magnetic field linking with said magnetic path, said element when at rest supporting said magnet means in registration with said pitch and when oscillating moving said magnet means in a direction generally radially of said wheel and within the radial range of said magnetic path, each said inclined region when viewed in the axial direction of the wheel being convex in one and the same circumferential direction of the wheel, each inclined region increasing in width in said one circumferential direction, and each said peak region having a predetermined radial extent greater than the width of said path, oscillation of said element to oscillate said magnet means causing rotation of said wheel in said one circumferential direction only with said magnet means traversing said path along said inclined regions from each peak region to the next.

2. A drive arrangement according to claim 1, in which said path has a width substantially equal to the magnetically effective width of said magnet means.

3. A drive arrangement according to claim 2, in which the narrowest portion of each inclined region is circumferentially spaced from the nearest said peak region in the said one circumferential direction and is located substantially at the juncture of the respective inclined region and the inclined region immediately therebehind.

4. A drive arrangement according to claim 3, in which each said peak region is substantially an extension of the inclined region leading thereto from the next-following peak region.

5. A drive arrangement according to claim 4, in which the side of each said peak region facing in said one circumferential direction is disposed generally radially and at a large angle to the said inclined region leading from the respective peak region to the next peak region in said one circumferential direction.

6. A drive arrangement according to claim 5, in which the said side of each peak region when extended intersects the said inclined region leading to the next following peak region near said pitch circle.

7. A drive arrangement according to claim 1, in which said wheel has a central portion inside said path, spokes connecting said central portion with said magnetic path, said spokes at the outer ends thereof being connected to said radially inner peak regions.

8. A drive arrangement according to claim 1, in which said magnetic path has the greatest circumferential extent near said pitch circle.

9. A drive arrangement according to claim 1, in which a high degree of coupling exists between said magnetic path and said magnet means and the force exerted on said wheel by said magnet means increases with the speed of oscillation of said oscillating element and the speed of rotation of said wheel.

10. A drive arrangement according to claim 1, in which said magnetic path is composed of a magnetic having high permeability and low hysteresis loss.

11. A drive arrangement according to claim 1, in which said magnet means is cylindrical with a diameter about equal to the width of the narrowest portion of said magnetic path, said magnet means being axially polarized and being presented endwise to said magnetic path.

12. A drive arrangement according to claim 11, in which said magnet means comprises a said cylindrical magnet on each side of said magnetic path.